Nov. 8, 1932.  A. L. HESS  1,887,202
TOW BAR FOR CYCLES
Original Filed July 13, 1929  2 Sheets-Sheet 1
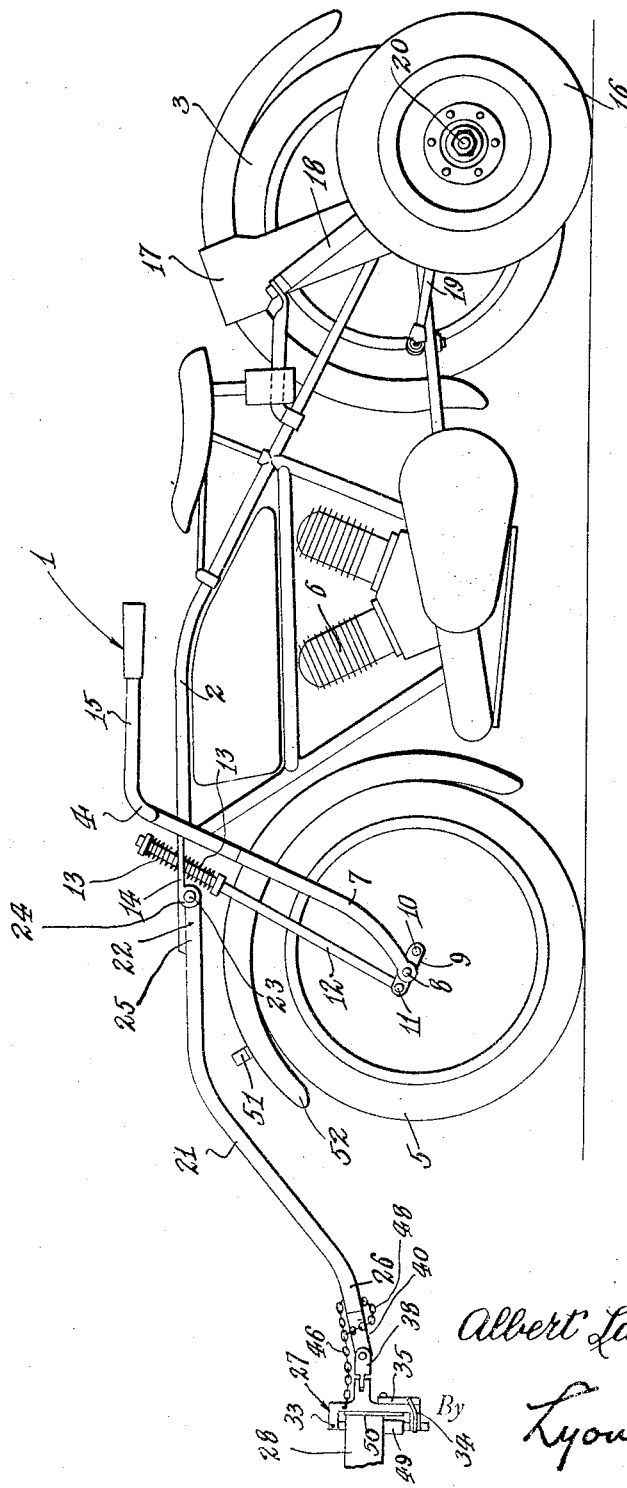
Inventor
Albert Laurance Hess
By Lyon & Lyon
Attorneys Nov. 8, 1932.  A. L. HESS  1,887,202
TOW BAR FOR CYCLES
Original Filed July 13, 1929   2 Sheets-Sheet 2
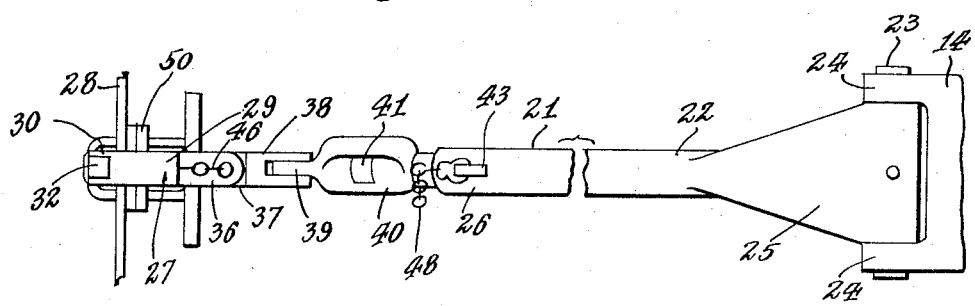
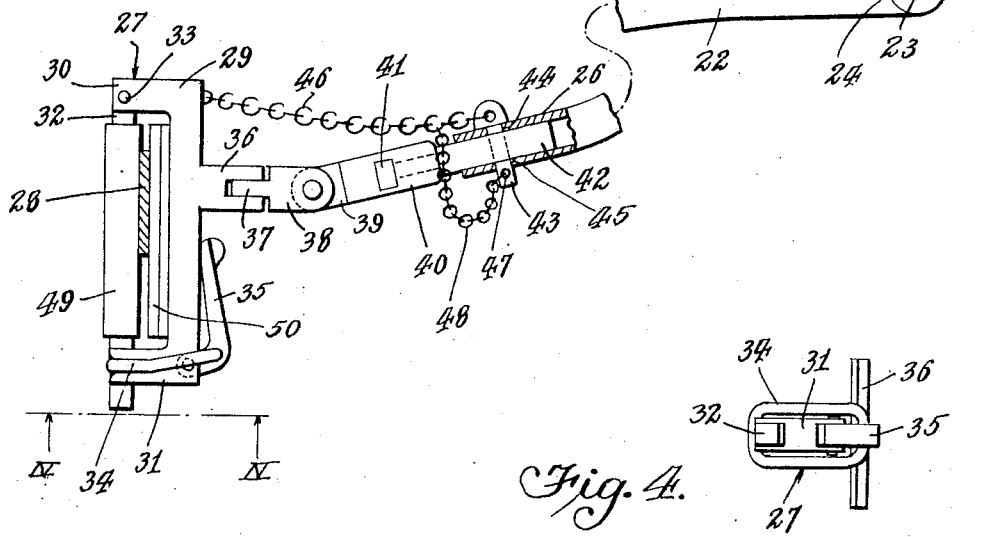
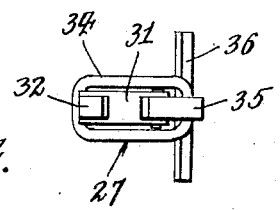

Patented Nov. 8, 1932

1,887,202

UNITED STATES PATENT OFFICE

ALBERT LAURANCE HESS, OF LOS ANGELES, CALIFORNIA, ASSIGNOR TO CYCLETOW CORPORATION, LTD., OF LOS ANGELES, CALIFORNIA, A CORPORATION OF CALIFORNIA

TOW-BAR FOR CYCLES

Original application filed July 13, 1929, Serial No. 378,096. Divided and this application filed March 17, 1931. Serial No. 523,239.

My invention relates to towable cycles and has particular reference to a towing or coupling bar for connecting a cycle to a vehicle by which it may be towed.

This application is a division of my co-pending application, Serial No. 378,096, filed July 13, 1929.

In my co-pending application, hereinabove referred to, I disclosed a two-wheel cycle provided with auxiliary wheels which were movable into engagement with the ground so as to maintain the cycle in an upright position when it is towed by another vehicle. That application also disclosed a coupling or tow-bar by which the cycle might be connected to the towing vehicle. The present application relates to the construction and operation of the coupling bar or towing bar.

It is an object of my invention to provide an attachment for a cycle by which the same may be connected to a towing vehicle and in which the tow-bar constitutes a rigid longitudinal connection between the vehicle and the cycle, but which permits relative lateral movement of the vehicle to the cycle.

Another object of the invention is to provide a towing bar or coupling for a cycle to connect the cycle to a vehicle by which it may be towed and in which the tow-bar constitutes a rigid connection preventing relative longitudinal movement of the cycle and vehicle and in which the lateral movement of the towing vehicle will operate the steering mechanism of the cycle to maintain the cycle in tractile relation therewith.

Another object of the invention is to provide a connecting clamp for connecting a tow-bar to a cycle to be towed with some suitable portion of the vehicle by which the cycle is to be towed.

Other objects of the invention will be apparent from a study of the following specification, read in connection with the accompanying drawings, wherein Figure 1 is a side elevational view of a cycle equipped with the tow-bar constructed in accordance with my invention;

Figure 2 is a plan view of the tow-bar construction illustrated in Fig. 1, and illustrating the clamping device by which the tow-bar is connected to the towed vehicle;

Figure 3 is a side elevational view, partly in section, of the tow-bar illustrated in Fig. 1; and Figure 4 is a detail bottom plan view of the clamp illustrated in Figs. 1, 2 and 3.

Referring to the drawings, I have illustrated in Fig. 1 a cycle 1 as comprising the usual motorcycle construction, including a frame 2 to which is secured a rear driving wheel 3 and a front fork assembly 4 to which is attached the front or steering wheel 5 of the cycle. The frame 2 constitutes a support for a suitable engine 6 which is employed to provide the motive power for the cycle 1.

The front fork assembly 4 constitutes a bifurcated member 7, the lower end 8 of which is secured to a link 9 intermediate its ends. One end of the link 9 is illustrated as constituting the support for an axle 10 upon which the front wheel 5 may rotate.

Connected to the opposite end 11 is the link 9 which is a bifurcated or fork-like brace 12 connected through springs 13 to a spring plate 14 rigidly secured to the stem (not shown) of the fork 7, this stem constituting the attachment for suitable handle bars 15 by which the front fork 7 and steering wheel 5 may be moved in the steering of the cycle 1.

The cycle 1 is illustrated as being provided with a device for maintaining the cycle in an upright position when it is moved along a road, this means comprising a pair of auxiliary wheels 16 (only one of which is shown) which may be attached in any suitable manner to the rear wheel assembly of the cycle 1. This attaching means is illustrated as comprising an inverted U-shaped bracket 17 straddling the rear wheel 3 of the cycle 1 and having attached thereto, as by means of connecting rods 18, 19 a pair of suitable axles 20 (only one of which is shown) upon which the auxiliary wheels 16 may rotate. The auxiliary wheel 16 may be arranged to be either extended into ground-engaging position or lifted into non-ground-engaging position, as by means of hingedly mounting the braces 18 or 19 in the manner shown and described in the parent application, of which this application is a division.

At the front of the cycle 1, I have illustrated a tow-bar 21 having one end 22 thereof pivotally secured to the spring plate 14, as is indicated by the hinge pin 23 passing through lugs 24 formed upon opposite sides of the plate 14. The plate 14 is thus formed with its outer end bifurcated to receive therebetween an enlarged head 25 formed upon the end 22 of the tow-bar 21. The head 25 may be formed of a relatively wide plate construction either integrally with the end 22 of the tow-bar 21 or constructed separately and secured to the tow-bar 21 in any suitable manner.

The tow-bar 21 is illustrated as comprising a hollow tubular member of such length as to extend considerably in advance of the forward limits of the front wheel 5 so that the outer end 26 of the tow-bar 21 may be secured to the vehicle by which the cycle is to be towed.

Attaching means for connecting the tow-bar 21 to the towing vehicle are illustrated herein as comprising a clamp 27 arranged to be placed in clamping relation with some outstanding portion of the towing vehicle, such as the bumper 28 with which such vehicles are usually equipped.

The clamp 27 is illustrated as comprising a base member 29 having formed at opposite ends thereof a pair of forwardly extending lugs 30 and 31. The lug 30 is illustrated as being bifurcated at its outer end to receive the upper end of a clamping plate 32 which may be attached to the lug 30 by means of a pivot pin 33.

The lower end of the clamping plate 33 is arranged to be received in the bifurcated end of the lower lug 31, and is arranged to be held in engagement with the lug 31, as by means of a spring clip 34 operated by a thumb lever 35. The spring clip 34 and thumb lever 35 are illustrated as being mounted in "over the center" relation so that when the thumb plate is moved into the position illustrated in Figs. 1 and 3, it will remain in this position to hold the clamping plate in clamped relation relative to the base 29.

A bifurcated lug 36 is formed upon the rear side of the base 39 arranged to receive the outstanding end 37 of a universal joint 38. The rear end of the link 38 is also bifurcated to receive therebetween the outstanding end 39 of a tubular connecting block 40 to the interior of which is swiveled a post 41 formed upon the end of a rod 42 of such diameter as to telescope within the open end 26 of the tow-bar 21. The rod 42 is arranged to be held within the tow-bar 21 by means of a pin 43 insertable through aligned openings 44 and 45 in the tow-bar 21 and rod 42, respectively. If desired, the pin 43 may be secured against inadvertent loss, as by means of connecting the same through a chain 46 to the base 29. To prevent inadvertent removal of the pin 43 from the tow-bar 21, the lower end of the pin may be provided with a cross pin 47 attached by means of a chain 48 to the chain 46.

The operation of my device is as follows: With the tow-bar 21 attached by means of its pivot pin 23 to the plate 14, the clamp 27 may be secured in clamping relation to the bumper 28 as by means of operating the thumb lever 35 to disengage the clip 34 from the clamping plate 32. The clamping plate 32 may then be rotated to its pivot 33 so that the bumper 28 may be inserted between the plate 32 and the base 29. If desired, the plate 28 may be provided with a suitable packing 49, a similar packing 50 being provided upon the inner face of the base 29 to prevent scarring or injury to the bumper 28 when the clamp is in place.

The clip 34 may now be engaged with the clamping plate 32 and the thumb lever 35 moved to the position illustrated in Fig. 3, so that the bumper is securely clamped between the clamping plate and the base.

The rod 42 may be inserted in the end 26 of the tow-bar 21 and secured therein as by means of the pin 43. In this position, the cycle 1 is secured to the towing vehicle so that any forward or rearward movement of the towing vehicle will move the cycle 1. By reason of the pivotal connection of the tow-bar 21 to the cycle 1 any vertical movement of the towing vehicle relative to the cycle 1 will be compensated for while the universal joint constituted by the connections between the universal joint member 38 and the tube 40 will also assist in preventing relative vertical movement of the cycle and its towing vehicle from causing injury to either machine.

Also the swiveling of the swivel connection 41 permits relative rotation of the towing vehicle and the cycle so that any relative twisting of the two machines when passing over uneven ground may be taken care of without injury to either machine.

The connection of the tow-bar 21 to the front fork assembly 4 is such that as the towing vehicle changes its course laterally with respect to the cycle, the front wheel 5 will be moved in the proper direction to bring the cycle into alignment with the new course pursued by the towing vehicle.

When the towing vehicle is to be disengaged from the cycle 1, the clamp 27 may be removed from the bumper 28 and the clamp assembly may be removed from the tow-bar 21 as by means of withdrawing the pin 43. The tow-bar 21 may then be lowered into position to engage and be received in a suitable supporting seat 51 which may be conveniently mounted upon the mud guard 52 attached to guard the front wheel 5 so that when the motorcycle is to be operated under its own power the tow-bar 21 will be supported against displacement under the shocks produced as the cycle travels over uneven ground.

While I have illustrated and described the preferred embodiment of my invention, I do not desire to be limited to any of the details shown or described herein, except as defined in the appended claims.

I claim:

1. In a bicycle construction, a tow bar for connecting said bicycle to a towing vehicle comprising, a bar, means rigidly securing one end of said bar to the upper portion of the front wheel steering fork assembly of said bicycle to cause lateral movement of said bar to correspondingly turn the front wheel assembly, but permitting vertical movement of said bar relative to said assembly, means for securing the other end of said bar to the towing vehicle, and a pair of rear auxiliary wheels constructed for lowering to the ground for maintaining the bicycle upright while being towed.

2. In a bicycle construction, a tow bar for connecting said bicycle to a towing vehicle, comprising, a bracket rigidly secured to the upper portion of the front wheel steering fork assembly of said bicycle, a tow bar having one end thereof secured to said bracket by means of a horizontal pivot, means for connecting the other end of said tow bar to said towing vehicle, and a pair of rear auxiliary wheels constructed for lowering to the ground for maintaining said bicycle upright while being towed.

3. In a bicycle construction, a tow bar for connecting said bicycle to a towing vehicle comprising, a tow bar having means on one end thereof for securing the same to the front wheel assembly of said bicycle near the handle bars of the bicycle, means for connecting the other end of said bar to the towing vehicle, means for maintaining said vehicle upright while being towed and means for locking the tow bar in lowered position on the front wheel mudguard when not in use.

4. In a bicycle construction, a tow bar for connecting said bicycle to a towing vehicle comprising, a bar, means rigidly securing one end of said bar to the front wheel assembly of said bicycle in lowered position to cause lateral movement of said bar to correspondingly turn the front wheel assembly, but permitting vertical movement of said bar relative to said assembly, means for securing the other end of said bar to the towing vehicle, and means for maintaining the bicycle upright while being towed, and means for supporting the outer end of said tow bar when not connected to a towing vehicle.

5. In a bicycle construction having a mud guard arranged above the front wheel thereof, a tow bar for connecting said bicycle to a towing vehicle comprising, a bar, means rigidly securing one end of said bar to the front wheel assembly of said bicycle near the handle bars to cause lateral movement of said bar to correspondingly turn the front wheel assembly, but permitting vertical movement of said bar relative to said assembly, means for securing the outer end of said bar to the towing vehicle, and means for maintaining the bicycle upright while being towed, a rest secured to said mud guard to engage and support the tow bar when the bicycle is not connected to a towing vehicle.

Signed at Los Angeles, California, this 9th day of March, 1931.

ALBERT LAURANCE HESS.